(12) United States Patent
Takeuchi et al.

(10) Patent No.: US 12,621,684 B2
(45) Date of Patent: May 5, 2026

(54) CONTROL SYSTEM AND CONTROL METHOD

(71) Applicant: RAKUTEN MOBILE, INC., Tokyo (JP)

(72) Inventors: Kazushige Takeuchi, Tokyo (JP); Masahiro Kojima, Tokyo (JP); Kyungmin Lee, Tokyo (JP); Makoto Ono, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 449 days.

(21) Appl. No.: 18/043,038

(22) PCT Filed: Mar. 24, 2021

(86) PCT No.: PCT/JP2021/012385
§ 371 (c)(1),
(2) Date: Feb. 27, 2023

(87) PCT Pub. No.: WO2022/201395

PCT Pub. Date: Sep. 29, 2022

(65) Prior Publication Data

US 2023/0328550 A1     Oct. 12, 2023

(51) Int. Cl.
*H04W 24/04*        (2009.01)
*H04W 16/22*        (2009.01)
(Continued)

(52) U.S. Cl.
CPC ........... *H04W 24/04* (2013.01); *H04W 16/22* (2013.01); *H04W 24/08* (2013.01); *H04W 28/10* (2013.01)

(58) Field of Classification Search
CPC ..... H04W 24/04; H04W 16/22; H04W 24/08; H04W 28/10
See application file for complete search history.

(56) References Cited

U.S. PATENT DOCUMENTS 7,142,868 B1 * 11/2006 Broyles ................. H04W 16/00
                                                            455/418
10,812,989 B2 * 10/2020 Jeong .................... H04W 16/22
(Continued)

FOREIGN PATENT DOCUMENTS

EP        2590443 A1    5/2013
JP        20165099 A    1/2016
(Continued)

OTHER PUBLICATIONS

International Search Report in PCT Application No. PCT/JP2021/012385, mailed Jun. 15, 2021, 5pp.

*Primary Examiner* — Dhaval V Patel
(74) *Attorney, Agent, or Firm* — HAUPTMAN HAM, LLP

(57)                ABSTRACT

Provided are a control system and a control method which are capable of reducing a monitoring load at a time when operation control for base station systems is executed. An exceptional monitoring module (38) monitors an operation state of a representative base station system of a plurality of base station systems included in a base station system group associated with an operation tendency of base station systems. An operation control module (40) executes operation control in accordance with the operation state of the representative base station system, for at least one base station system which includes a base station system different from the representative base station system, and is included in the base station system group.

12 Claims, 6 Drawing Sheets

(51) Int. Cl.
    *H04W 24/08*        (2009.01)
    *H04W 28/10*        (2009.01)

(56)           References Cited

U.S. PATENT DOCUMENTS

| | | | | |
|---|---|---|---|---|
| 2010/0273493 A1 * | 10/2010 | Matsunaga | ......... | H04L 43/0876 |
| | | | | 455/446 |
| 2013/0102301 A1 * | 4/2013 | Shinada | ................ | H04W 28/12 |
| | | | | 455/418 |
| 2016/0286479 A1 * | 9/2016 | Karkera | ................ | H04W 24/02 |
| 2020/0267093 A1 | 8/2020 | Kamachi | | |
| 2021/0259002 A1 * | 8/2021 | Hosseini | ............. | H04W 74/006 |
| 2024/0036631 A1 * | 2/2024 | Ma | ........................ | G06F 1/3296 |

FOREIGN PATENT DOCUMENTS

| | | | | | |
|---|---|---|---|---|---|
| JP | 2016005099 A | * | 1/2016 | ............ | Y02D 30/70 |
| WO | 2009075246 A1 | | 6/2009 | | |
| WO | 2012001772 A1 | | 1/2012 | | |
| WO | 2017110678 A1 | | 6/2017 | | |

* cited by examiner

FIG.2

| ID |
| --- |
| DATE AND TIME DATA |
| NUMBER-OF-ACCOMMODATED-PERSON DATA |
| TRAFFIC AMOUNT DATA |

CONTROL SYSTEM AND CONTROL METHOD

RELATED APPLICATIONS

The present application is a National Phase of International Application Number PCT/JP2021/012385, filed Mar. 24, 2021.

TECHNICAL FIELD

The present invention relates to a control system and a control method.

BACKGROUND ART

In Patent Literature 1, there is described a configuration in which a decrease in communication speed due to lack of resources is suppressed by increasing the number of operating virtual nodes in a partial communication area in which a sudden increase in traffic has occurred. Moreover, in Patent Literature 1, there is described a configuration in which an increase in power consumption of servers is suppressed by reducing the number of operating virtual nodes in a partial communication area in which a sudden decrease in traffic has occurred.

CITATION LIST

Patent Literature

[Patent Literature 1] WO 2017/110678 A1

SUMMARY OF INVENTION

Technical Problem

When the technology described in Patent Literature 1 is used to execute operation control for base station systems, it is required to monitor, for each base station system, traffic of an area covered by this base station system. Consequently, a monitoring load is high when the number of base station systems is large.

The present invention has been made in view of the above-mentioned circumstances, and has an object to provide a control system and a control method which are capable of reducing a monitoring load at a time when operation control for base station systems is executed.

Solution to Problem

In order to solve the above-mentioned problem, according to one embodiment of the present invention, there is provided a control system including: monitoring means for monitoring an operation state of a representative base station system of a plurality of base station systems included in a base station system group associated with an operation tendency of base station systems; and control means for executing operation control in accordance with the operation state of the representative base station system, for at least one of the plurality of base station systems, which includes a base station system different from the representative base station system, and is included in the base station system group.

In one aspect of the present invention, the control means is configured to execute the operation control in response to a state in which a value indicating the operation state of the representative base station system satisfies a predetermined condition.

Further, in one aspect of the present invention, the control means is configured to execute the operation control in response to a state in which a level of the operation state of the representative base station system exceeds a predetermined level.

As another example, the control system further includes prediction means for predicting, for each of the plurality of base station systems included in the base station system group, a traffic amount in an area covered by the each of the plurality of base station systems, and the control means is configured to execute, when, for each of the plurality of base station systems included in the base station system group, normal operation control based on the traffic amount predicted for the each of the plurality of base station systems is being executed, exceptional operation control in accordance with the operation state of the representative base station system, for at least one of the plurality of base station systems, which includes a base station system different from the representative base station system, and is included in the base station system group, in response to a state in which a level of the operation state of the representative base station system exceeds a predetermined level.

As still another example, the control system further includes prediction means for predicting, for each of the plurality of base station systems included in the base station system group, a traffic amount in an area covered by the each of the plurality of base station systems, and the control means is configured to execute, when, for each of the plurality of base station systems included in the base station system group, normal operation control based on the traffic amount predicted for the each of the plurality of base station systems is being executed, exceptional operation control in accordance with the operation state of the representative base station system, for at least one of the plurality of base station systems, which includes a base station system different from the representative base station system, and is included in the base station system group, in response to a state in which a difference between an actual traffic amount of the representative base station system and the predicted traffic amount of the representative base station system satisfies a predetermined condition.

Further, in one aspect of the present invention, the control system further includes classification means for classifying a plurality of base station systems into a plurality of base station system groups each associated with an operation tendency of base station systems.

In this aspect, the classification means may be configured to classify the plurality of base station systems into the plurality of base station system groups based on a characteristic of areas covered by the base station systems.

Further, the classification means may be configured to classify the plurality of base station systems into the plurality of base station system groups based on a tendency of a traffic transition or a transition of a number of accommodated persons in areas covered by the base station systems.

In this case, the classification means may be configured to classify the plurality of base station systems into the plurality of base station system groups based on a tendency of a traffic amount or a number of accommodated persons in each time period, each day of week, or each day-of-week period in the areas covered by the base station systems.

Further, the classification means may be configured to classify the plurality of base station systems into the plurality of base station system groups based on a tendency of a traffic transition or a transition of a number of accommodated persons which is associated with a user attribute of users who perform communication in areas covered by the base station systems.

Further, in one aspect of the present invention, the control system further includes selection means for selecting the representative base station system from among the plurality of base station systems included in the base station system group.

Further, in one aspect of the present invention, the control means is configured to execute power consumption control.

Further, according to one embodiment of the present invention, there is provided a control method including the steps of: monitoring an operation state of a representative base station system of a plurality of base station systems included in a base station system group associated with an operation tendency of base station systems; and executing operation control in accordance with the operation state of the representative base station system, for at least one of the plurality of base station systems, which includes a base station system different from the representative base station system, and is included in the base station system group.

BRIEF DESCRIPTION OF DRAWINGS

FIG. 2 is a diagram for illustrating an example of data structure of parameter data.

DESCRIPTION OF EMBODIMENTS

One embodiment of the present invention is now described in detail with reference to the drawings.

Figure 1:
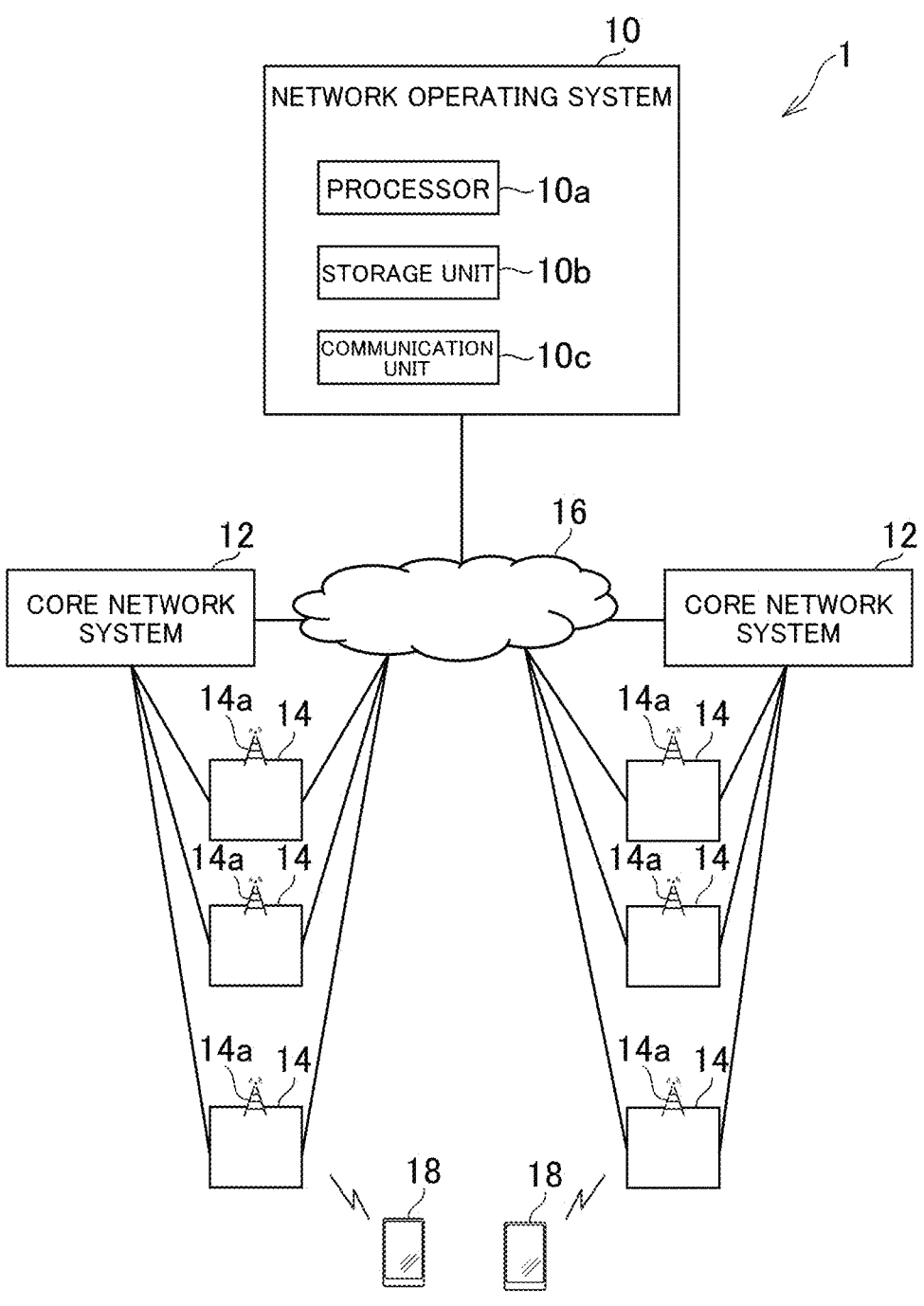
FIG. 1 is a diagram for illustrating an example of a communication system in one embodiment of the present invention.

FIG. 1 is a diagram for illustrating an example of a communication system 1 in the one embodiment of the present invention. As illustrated in FIG. 1, the communication system 1 in this embodiment includes a network operating system (NOS) 10, a plurality of core network systems 12, and a plurality of base station apparatus 14. The NOS 10, the core network systems 12, and the base station apparatus 14 are connected to a computer network 16, for example, the Internet.

The core network system 12 is a system corresponding to an evolved packet core (EPC) in a fourth generation mobile communication system (hereinafter referred to as "4G") or a 5G core network (5GC) including an access and mobility management function (AMF), a session management function (SMF), a user plane function (UPF), and the like in a fifth generation mobile communication system (hereinafter referred to as "5G"). The core network system 12 in this embodiment is implemented by a group of servers arranged in a plurality of data centers provided at various locations. A plurality of servers are arranged in each data center.

Although two core network systems 12 are illustrated in FIG. 1, the number of core network systems 12 in this embodiment is not limited to two, and may be one or three or more.

The base station apparatus 14 is a computer system corresponding to an eNodeB (eNB) in 4G and an NR base station (gNB) in 5G, and a computer system provided with an antenna 14a. The base station apparatus 14 in this embodiment includes one or a plurality of servers. The base station apparatus 14 may be implemented by a group of servers arranged in a data center.

Further, a virtual DU (vDU) and a virtual CU (vCU), which are components of a radio access network (RAN) in 4G, may be arranged in the base station apparatus 14 or may be incorporated in a part of the core network system 12. In the same manner, a DU and a CU, which are components of the RAN in 5G, may be arranged in the base station apparatus 14 or may be incorporated in a part of the core network system 12.

In this embodiment, when the components of the RAN are not built into the core network system 12, a base station system 20 (see FIG. 3) in the following description refers to a system corresponding to the base station apparatus 14. Moreover, when the components of the RAN are built into the core network system 12, the base station system 20 in the following description refers to a system including the base station apparatus 14 and those components of the core network system 12.

The NOS 10 in this embodiment is configured, for example, on a cloud platform and includes a processor 10a, a storage unit 10b, and a communication unit 10c, as illustrated in FIG. 1. The processor 10a is a program control device, for example, a microprocessor which operates in accordance with a program installed in the NOS 10. The storage unit 10b is, for example, a storage element such as a ROM or RAM, a solid state drive (SSD), a hard disk drive (HDD), or the like. The storage unit 10b stores a program to be executed by the processor 10a, and the like. The communication unit 10c is, for example, a communication interface such as an NIC or a wireless LAN module. The communication unit 10c transmits and receives data to/from the core network system 12, and the base station apparatus 14 via the computer network 16.

The communication system 1 in this embodiment provides network services such as a voice communication service and a data communication service to users who use user equipment (UE) 18.

The network service provided in this embodiment is not limited to a voice communication service and a data communication service. The network service provided in this embodiment may be, for example, an IoT service.

Further, in this embodiment, a container type application execution environment, for example, Docker, is installed in the servers arranged in the core network system 12 and the base station apparatus 14, and containers can be deployed in those servers and operated. In those servers, clusters (Kubernetes clusters) managed by a container management tool, for example, the Kubernetes, may be constructed. After that, a container-type application may be executed on the constructed cluster.

The network service provided in this embodiment is implemented by a cloud-native network function (CNF), which is a container-based functional unit.

In this embodiment, for example, the NOS 10 monitors the plurality of base station systems 20 included in the communication system 1. In this monitoring, the NOS 10 acquires parameter data indicating values of parameters including various performance indices such as a traffic amount and a number of accommodated persons in each base station system 20, which have, for example, data structure illustrated in FIG. 2. In this case, for example, each base station system 20 may successively transmit the parameter data to the NOS 10. After that, the NOS 10 may receive the parameter data transmitted from each base station system 20. As another example, the NOS 10 may successively access each base station system 20, and may collect the parameter data from this base station system 20.

The parameter data acquired from the base station system 20 includes, as illustrated in FIG. 2, for example, an ID being identification information on the base station system 20, date-and-time data indicating date and time when the number of accommodated persons and the traffic amount are specified, number-of-accommodated-person data indicating the number of accommodated persons of the base station system 20, and traffic amount data indicating the traffic amount of the base station system 20.

After that, the NOS 10 predicts, for example, at intervals of a predetermined unit period t1 (for example, 30 minutes), for each base station system 20, a traffic amount in a next unit period t1 in the base station system 20 based on the parameter data received from the base station system 20. The NOS 10 may predict the traffic amount, for example, at the intervals of the predetermined unit period t1 based on the number of accommodated persons, the traffic amount in the unit period t1, and a time associated with the unit period t1 (for example, a start time or an end time of the unit period t1). In this case, the traffic amount may be predicted through use of a trained machine learning model.

After that, the NOS 10 controls, for each base station system 20, an amount of power consumption in this base station system 20 based on the predicted traffic amount. In this case, for example, an optimal frequency of processors (for example, CPU frequency) in the base station system 20 may be determined so that power saving (operation in a power saving state) suitable for the predicted traffic amount is executed. After that, the NOS 10 may control, for each base station system 20, the CPU frequency of CPUs operating in this base station system 20 so that the determined frequency is achieved.

The NOS 10 may determine an optimal CPU frequency based on the parameter data through execution of, for example, a predetermined power saving algorithm.

The above-mentioned operation control based on the predicted traffic amount is hereinafter referred to as "normal operation control." Moreover, monitoring (for example, acquisition of the parameter data) executed in the normal operation control is referred to as "normal monitoring."

Figure 3:
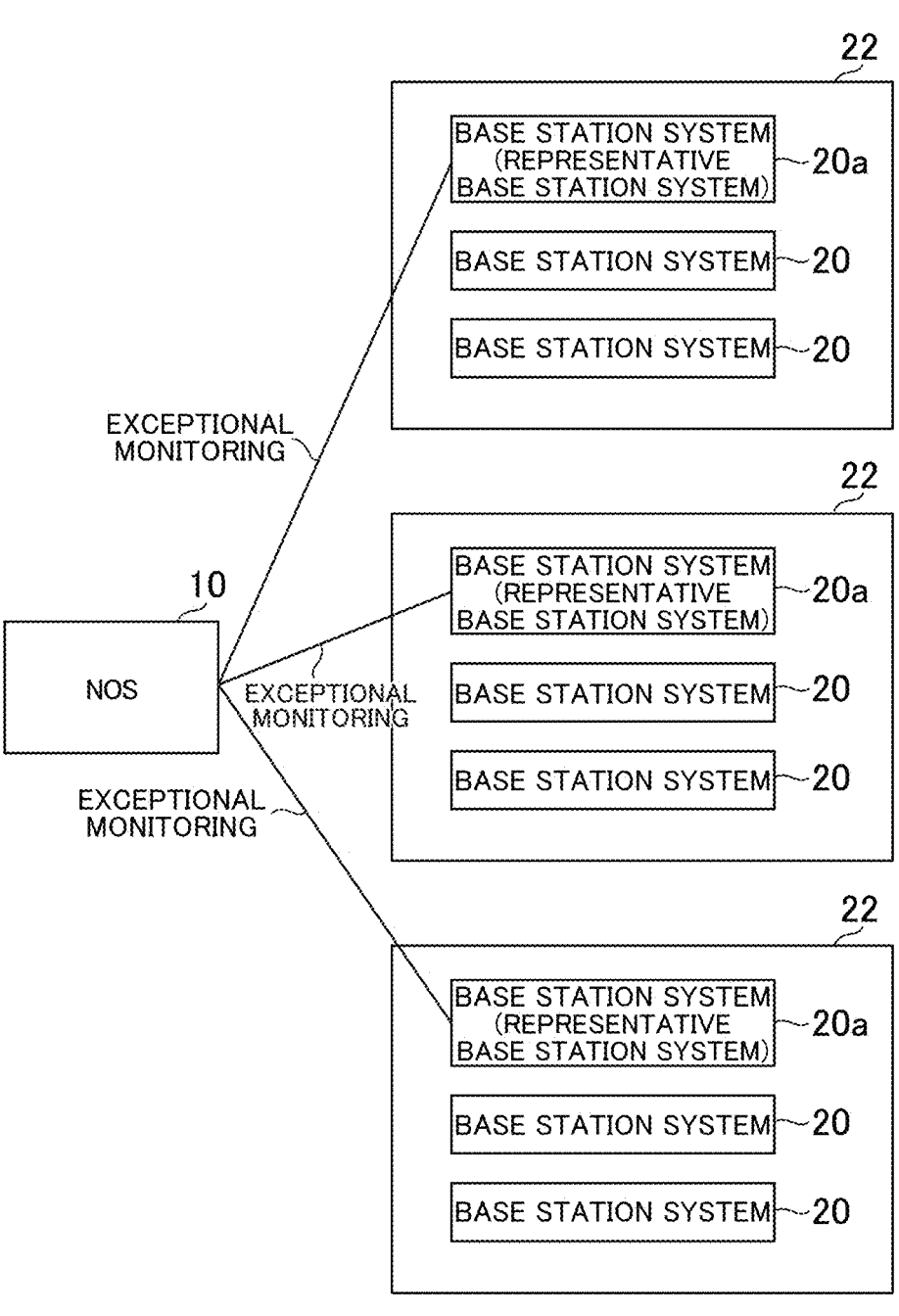
FIG. 3 is an explanatory diagram for schematically illustrating an example of classification and exceptional monitoring of base station systems.

In this embodiment, for example, exceptional operation control is executed apart from the above-mentioned normal operation control. In this embodiment, in order to execute exceptional operation control, for example, as illustrated in FIG. 3, the plurality of base station systems 20 included in the communication system 1 are classified, based on an operation tendency of the base station systems 20, into base station system groups 22 each including a plurality of base station systems 20. The base station system groups 22 classified in this manner are associated with the operation tendency of the base station systems 20.

For example, the base station systems 20 may be classified based on a characteristic of an area covered by the base station system 20.

For example, the base station systems 20 may be classified based on usage, a daytime population density, a nighttime population density, and the like of the area covered by the base station system 20. More specifically, for example, the plurality of base station systems 20 included in the communication system 1 may be classified into a commercial area base station system group covering commercial areas, a residential area base station system group covering residential areas, a business area base station system group covering business areas, and the like.

Moreover, the base station systems 20 may be classified based on a tendency of a transition of the traffic or a transition of the number of accommodated persons (for example, a tendency of the traffic amount or the number of accommodated persons for each time period, each day of week, or each day-of-week period) in the area covered by the base station system 20. For example, the base station systems 20 may be classified based on a user attribute (such as a gender, an age, or a generation) of users who perform communication in the area covered by the base station system 20. Moreover, the base station systems 20 may be classified based on a combination of a plurality of items among the above-mentioned items.

For example, the plurality of base station systems 20 included in the communication system 1 may be classified into a base station system group 22 having a large traffic amount in the daytime and a base station system group 22 having a large traffic amount in the nighttime. Moreover, the plurality of base station systems 20 included in the communication system 1 may be classified into a base station system group 22 having a large traffic amount on the weekdays and a base station system group 22 having a large traffic amount on the holidays.

Further, the plurality of base station systems 20 included in the communication system 1 may be classified into a base station system group 22 having a large traffic amount in the daytime on the weekdays, a base station system group 22 having a large traffic amount in the nighttime on the weekdays, a base station system group 22 having a large traffic amount in the daytime on the holidays, and a base station system group 22 having a large traffic amount in the nighttime on the holidays.

Still further, for example, the plurality of base station systems 20 included in the communication system 1 may be classified based on a combination of the generation, the gender, and the time period. For example, the classification may be executed so that a base station system group 22 having a large traffic amount caused by males in the twenties in the daytime is formed.

In this embodiment, for example, for each base station system group 22, a representative base station system 20a is selected from among the plurality of base station systems 20 included in this base station system group 22. In this case, for example, the representative base station system 20a may randomly be selected from among the plurality of base station systems 20 included in the base station system group 22. Moreover, for example, of the plurality of base station systems 20 included in the base station system group 22, a base station system 20 geographically closest to a center may be selected as the representative base station system 20a in the base station system group 22. The number of the representative base station systems 20a selected in the base station system group 22 may be one, or two or more.

In this embodiment, in order to detect an occurrence of a predetermined exceptional state, the operation state of the representative base station system 20a is monitored. This monitoring is hereinafter referred to as "exceptional monitoring." In this case, for example, there are monitored a CPU usage rate, the amount of power consumption, the CPU frequency, and the traffic amount of the representative base station system 20*a* and the number of accommodated persons in the area covered by this representative base station system 20*a*. In the exceptional monitoring, items which are not the monitoring items in the normal monitoring may be monitored. For example, values of parameters, for example, performance indices not shown in the parameter data used for the normal operation control (for example, a value of the CPU usage rate), may be monitored.

In this embodiment, when an occurrence of the predetermined exceptional state is detected in the representative base station system 20*a* in the exceptional monitoring, exceptional operation control being predetermined operation control is executed for the base station system group 22 including the representative base station system 20*a* in response to the detection.

For example, it is assumed that a state in which the CPU usage rate of the representative base station system 20*a* exceeds a predetermined amount has occurred. In this case, for example, power consumption control for maximizing the power consumption amount may be executed in all of the base station systems 20 included in the base station system group 22 to which the representative base station system 20*a* belongs. More specifically, for example, control may be performed so that the CPU frequency of all of the base station systems 20 included in the base station system group 22 to which the representative base station system 20*a* belongs reaches the highest CPU frequency that can be set in the base station systems 20.

It is not required to execute uniform exceptional operation control in all of the base station systems 20 included in the base station system group 22 to which the representative base station system 20*a* in which the predetermined exceptional state has occurred belongs. For example, for each of the base station systems 20 included in the base station system group 22 to which the representative base station system 20*a* in which the predetermined exceptional state has occurred belongs, the exceptional operation control in accordance with the operation state of this base station system 20 may be executed. Moreover, the exceptional operation control may be executed only for a part of the plurality of base station systems 20 included in the base station system group 22 to which the representative base station system 20*a* in which the predetermined exceptional state has occurred belongs.

For example, when an operation is executed at saved power in the base station system 20 in the normal time, a sudden increase in traffic amount may occur, and the CPU usage rate may consequently increase suddenly. In this case, it is desired that the operation at the saved power be immediately canceled in order to process the suddenly increased traffic amount.

When the monitoring for an occurrence of the exceptional state, for example, the sudden increase in the traffic amount, is executed for all of the base station systems 20, a monitoring load is high.

In this embodiment, as described above, the exceptional monitoring is executed only for the representative base station system 20*a*. After that, in response to an occurrence of the exceptional state in the representative base station system 20*a*, the exceptional operation control is executed for at least one base station system 20 included in the base station system group 22 to which this representative base station system 20*a* belongs.

In this manner described above, according to this embodiment, it is possible to reduce the monitoring load at the time when the operation control for the base station systems 20 is executed.

Description is further given of functions of the NOS 10 in this embodiment and processes executed in the NOS 10 while focusing on the above-mentioned operation control.

Figure 4:
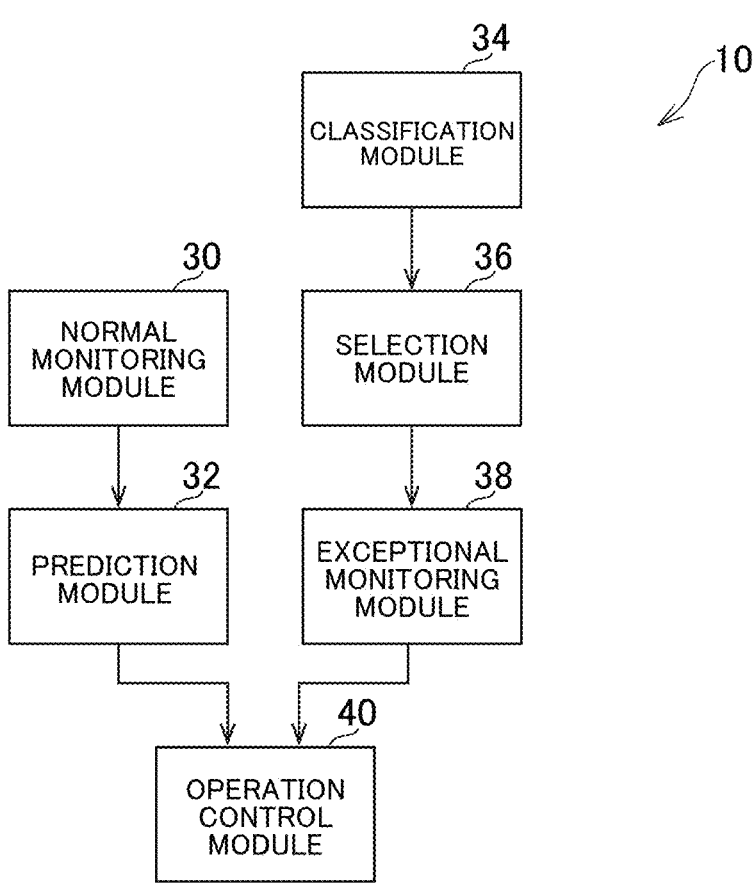
FIG. 4 is a functional block diagram for illustrating an example of functions implemented by an NOS in the one embodiment of the present invention.

FIG. 4 is a functional block diagram for illustrating an example of functions implemented by the NOS 10 in this embodiment. It is not required to implement all of the functions of FIG. 4 in the NOS 10 in this embodiment. Moreover, functions other than the functions of FIG. 4 may be implemented.

As illustrated in FIG. 4, the NOS 10 in this embodiment functionally includes, for example, a normal monitoring module 30, a prediction module 32, a classification module 34, a selection module 36, an exceptional monitoring module 38, and an operation control module 40.

The normal monitoring module 30 and the exceptional monitoring module 38 are mainly implemented by the communication unit 10*c*. The prediction module 32 and the selection module 36 are mainly implemented by the processor 10*a*. The classification module 34 is mainly implemented by the processor 10*a* and the storage unit 10*b*. The operation control module 40 is mainly implemented by the processor 10*a* and the communication unit 10*c*.

The above-mentioned functions may be implemented by executing, by the NOS 10, a program that is installed in the NOS 10, which is a computer, and that includes instructions corresponding to the above-mentioned functions. Further, this program may be supplied to the NOS 10 via a computer-readable information storage medium such as an optical disc, a magnetic disk, a magnetic tape, a magneto-optical disc, or the like, or via the Internet or the like.

In this embodiment, the normal monitoring module 30 executes, for example, the normal monitoring for the plurality of base station systems 20. For example, the normal monitoring module 30 acquires the parameter data from each of the plurality of base station systems 20.

In this embodiment, the prediction module 32 predicts, for example, for each of the plurality of base station systems 20, the traffic amount in the area covered by this base station system 20.

In this embodiment, for example, the classification module 34 classifies the plurality of base station systems 20 included in the communication system 1 into a plurality of base station system groups 22 each associated with an operation tendency of the base station systems 20.

The classification module 34 may classify the plurality of base station systems 20 included in the communication system 1 into the plurality of base station system groups 22 based on a characteristic of areas covered by the base station systems 20. In this case, for example, the classification module 34 may store map data indicating a geographical distribution of the core network systems 12 and the base station apparatus 14 and usage of each district, and statistical data indicating the daytime population density, the nighttime population density, and the like in each district. The classification module 34 may classify the plurality of base station systems 20 into the plurality of base station system groups 22 based on data such as the map data and the statistical data.

Further, the classification module 34 may classify the plurality of base station systems 20 included in the communication system 1 into the plurality of base station system groups 22 based on a tendency of the traffic transition or a transition of the number of accommodated persons in the areas covered by the base station systems 20. In this case, the classification module 34 may classify the plurality of base station systems 20 included in the communication system 1 into the plurality of base station system groups 22 based on the tendency of the traffic amount or the number of accommodated persons in each time period, each day of week, or each day-of-week period in the areas covered by the base station systems 20.

Further, the classification module 34 may classify the plurality of base station systems 20 included in the communication system 1 into the plurality of base station system groups 22 based on the tendency of the traffic transition or the transition of the number of accommodated persons which is associated with a user attribute of users who perform communication in the areas covered by the base station systems 20.

For example, a communication history in communication through use of the communication system 1 may be accumulated in the classification module 34. After that, the classification module 34 may identify, for each base station system 20, the tendency of the traffic transition or the transition of the number of accommodated persons in the area covered by this base station system 20 based on the accumulated communication history. For example, the classification module 34 may identify, for each base station system 20, the tendency of the traffic amount or the number of accommodated persons in each time period, on each day of week, or in each day-of-week period in the area covered by this base station system 20 based on the accumulated communication history. In this case, the tendency of the traffic amount or the number of accommodated persons may be identified for each user attribute.

Moreover, the classification module 34 may identify, for each base station system 20, the tendency of the traffic transition or the transition of the number of accommodated persons in the area covered by this base station system 20 based on the parameter data acquired by the normal monitoring module 30.

After that, the classification module 34 may classify, based on the tendency of the traffic amount or the number of accommodated persons identified as described above, the plurality of base station systems 20 included in the communication system 1 into the plurality of base station system groups 22.

In this embodiment, for example, the selection module 36 selects, for each of the plurality of base station system groups 22, a representative base station system 20a from among the plurality of base station systems 20 included in this base station system group 22.

The selection module 36 may randomly select a representative base station system 20a from among the plurality of base station systems 20 included in the base station system group 22. Moreover, for example, of the plurality of base station systems 20 included in the base station system group 22, the selection module 36 may select a base station system 20 geographically closest to a center as the representative base station system 20a in the base station system group 22.

The selection module 36 may select one representative base station system 20a or a plurality of representative base station systems 20a for one base station system group 22.

In this embodiment, for example, the exceptional monitoring module 38 monitors the operation state of the representative base station system 20a of the plurality of base station systems 20 included in the base station system group 22 associated with the operation tendency of the base station systems 20. The monitoring by the exceptional monitoring module 38 is, for example, the above-mentioned exceptional monitoring.

In this embodiment, for example, the operation control module 40 executes, for each of the plurality of base station systems 20, the normal operation control based on the traffic amount predicted for this base station system 20.

Moreover, in this embodiment, for example, the operation control module 40 executes the exceptional operation control, which is the operation control in accordance with the operation state of the representative base station system 20a, for at least one base station system 20 which includes a base station system 20 different from the representative base station system 20a, and is included in the base station system group 22 to which the representative base station system 20a belongs.

The operation control module 40 may execute the exceptional operation control in response to a state in which a value indicating the operation state of the representative base station system 20a satisfies a predetermined condition. For example, the operation control module 40 may execute the exceptional operation control in response to a state in which a level of the operation state of the representative base station system 20a exceeds a predetermined level. In this case, while the normal operation control is being executed, the exceptional operation control may be executed in response to the state in which the level of the operation state of the representative base station system 20a exceeds the predetermined level.

Moreover, the exceptional operation control may be executed for all of the base station systems 20 included in the base station system group 22 to which the representative base station system 20a belongs in response to the state in which the level of the operation state of the representative base station system 20a exceeds the predetermined level. Further, the exceptional operation control may be executed for a part of the base station systems 20 included in the base station system group 22 to which the representative base station system 20a belongs in response to the state in which the level of the operation state of the representative base station system 20a exceeds the predetermined level.

In the normal operation control and the exceptional operation control, for example, the operation control module 40 may transmit a control signal relating to the operation control to the base station systems 20 subject to this operation control. After that, the base station systems 20 that have received the control signal may execute the operation control corresponding to the control signal.

Moreover, as described above, in the normal operation control and the exceptional operation control, the operation control module 40 may execute power consumption control, for example, control of changing the CPU frequency.

For example, as in the above-mentioned example, the operation control module 40 may identify the base station system group 22 including the representative base station system 20a in response to a state in which the value indicating the CPU usage rate of the representative base station system 20a monitored by the exceptional monitoring module 38 exceeds a predetermined threshold value. After that, the operation control module 40 may execute operation control of increasing the CPU frequency for at least one base station system 20 included in the identified base station system group 22. For example, the operation control module 40 may execute, for at least one base station system 20 included in the identified base station system group 22, operation control so that the CPU frequency reaches the maximum CPU frequency that can be set in this base station system 20. In this manner, the CPU frequency of the CPUs of the server groups included in the base station system 20 subject to the operation control is changed.

The operation state monitored by the exceptional monitoring module 38 is not limited to the CPU usage rate as in the above-mentioned example. For example, the CPU frequency, the amount of power consumption, the number of accommodated persons, the traffic amount, and the like may be monitored.

Moreover, in this embodiment, while the normal operation control is being executed, the operation control module 40 may execute the exceptional operation control in response to a state in which a difference between an actual traffic amount and the predicted traffic amount of the representative base station system 20a satisfies a predetermined condition. For example, the exceptional operation control may be executed when the actual traffic amount has become equal to or larger than the predicted traffic amount by a predetermined amount or when the actual traffic amount has become equal to or larger than a predetermined multiple of the predicted traffic amount.

Figure 5:
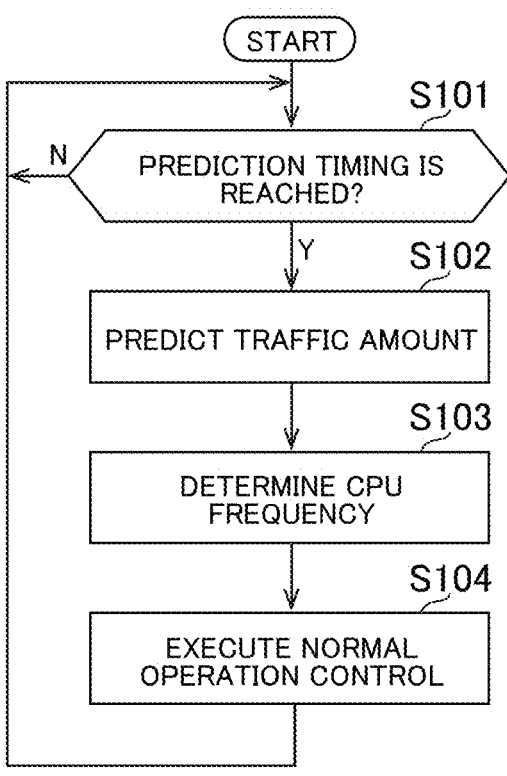
FIG. 5 is a flow chart for illustrating an example of a flow of a process executed by the NOS in the one embodiment of the present invention.

With reference to a flow chart exemplified in FIG. 5, description is now given of an example of a flow of a process relating to the normal operation control executed in the NOS 10 in this embodiment.

First, the prediction module 32 waits until a prediction timing that occurs at the intervals of the predetermined unit period t1 is reached (Step S101).

When the predetermined timing is reached, the prediction module 32 predicts a traffic amount in the next unit period t1 based on the parameter data acquired in the last unit period t1 for each of the plurality of base station systems 20 (Step S102).

After that, the operation control module 40 determines, for each of the plurality of base station systems 20, an optimal CPU frequency based on the traffic amount predicted in the process step of Step S102 (Step S103). In this case, for example, a table associating the traffic amount and the optimal CPU frequency with each other may be stored in advance in the operation control module 40, and the optimal CPU frequency may be determined based on this table. Moreover, the optimal CPU frequency may be determined through use of a trained machine learning model.

After that, the operation control module 40 executes, for each of the plurality of base station systems 20, the normal operation control so that the CPUs of the servers included in this base station system 20 operate at the CPU frequency determined in the process step of Step S102 (Step S104), and the process returns to the process step of Step S101.

Figure 6:
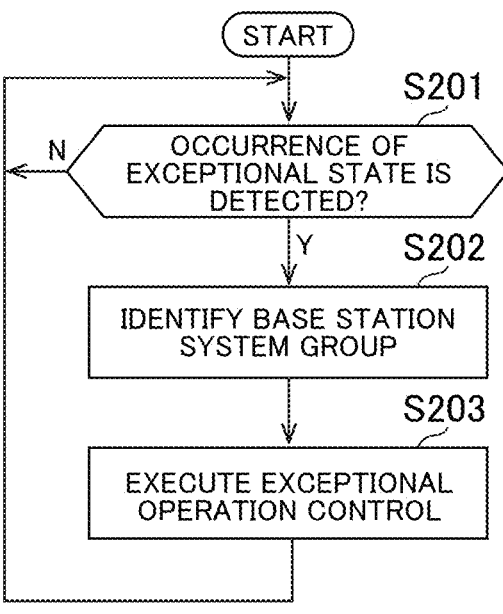
FIG. 6 is a flow chart for illustrating an example of the flow of a process executed by the NOS in the one embodiment of the present invention.

With reference to a flow chart exemplified in FIG. 6, description is now given of an example of a flow of a process relating to the exceptional operation control executed in the NOS 10 in this embodiment. In the process described in this process example, it is assumed that the exceptional monitoring module 38 monitors the operation state of each of the plurality of representative base station systems 20a.

First, the exceptional monitoring module 38 monitors the operation state of the representative base station system 20a (Step S201). In the process step of Step S201, for example, the CPU usage rate of the representative base station system 20a is monitored.

After that, in response to a state in which the exceptional monitoring module 38 detects an occurrence of the predetermined exceptional state in the monitored operation state, the operation control module 40 identifies the base station system group 22 including the representative base station system 20a in which the occurrence of the predetermined exceptional state has been detected (Step S202). For example, in response to the state in which the value indicating the CPU usage rate of the representative base station system 20a exceeds the predetermined threshold value, the base station system group 22 including this representative base station system 20a is identified.

After that, the operation control module 40 executes the exceptional operation control for all of the base station systems 20 included in the base station system group 22 identified in the process step of Step S202 (Step S203), and the process returns to the process step of Step S201. For example, for all of the base station systems 20 included in the base station system group 22 identified in the process step of Step S202, there is executed the exceptional operation control of controlling the CPUs of the servers included in those base station systems 20 so that the CPU frequencies of the CPUs reach the highest CPU frequency that can be set. In this embodiment, for example, the exceptional operation control is executed also for the representative base station system 20a included in the base station system group 22 identified in the process step of Step S202.

The exceptional monitoring executed in the process step of Step S201 may be executed at intervals of, for example, a predetermined period t2 (for example, five minutes). In this case, for example, the representative base station system 20a may transmit, to the NOS 10, CPU usage rate data indicating the CPU usage rate of the representative base station system 20a successively (for example, at intervals of five minutes). After that, the NOS 10 may receive the CPU usage rate data transmitted from the representative base station system 20a. As another example, the NOS 10 may access the representative base station system 20a, and may collect the CPU usage rate data indicating the CPU usage rate from the representative base station system 20a successively (for example, at intervals of five minutes).

As another example, in response to the state in which the value indicating the CPU usage rate of the representative base station system 20a exceeds the predetermined threshold value, this representative base station system 20a may transmit an exceptional state notification to the NOS 10. After that, the exceptional monitoring module 38 may receive the exceptional state notification. In this case, the reception of the exceptional state notification corresponds to the above-mentioned detection of the occurrence of the exceptional state. After that, in response to the reception of the exceptional state notification, the process steps of Step S202 and Step S203 may be executed.

Note that, the present invention is not limited to the embodiment described above.

For example, also in the normal operation control, the normal monitoring may be executed for only the representative base station system 20a. After that, for at least one base station system 20 which includes a base station system 20 different from the representative base station system 20a, and is included in the base station system group 22 to which the representative base station system 20a belongs, the normal operation control in accordance with the traffic amount predicted for the representative base station system 20a may be executed. With this configuration, not only the exceptional monitoring, but also the normal monitoring is not executed for the base station systems 20 that are not the representative base station system 20a. Consequently, a monitoring load can further be reduced.

Moreover, the operation control, which is executed in accordance with the operation state of the representative base station system 20a, and is executed for other base station systems 20, may be operation control (power saving control) of reducing the power consumption, for example, the operation control of reducing the CPU frequency.

Further, the normal operation control and the exceptional operation control in this embodiment are not limited to the control of changing the CPU frequency as described in the above-mentioned example. For example, in the exceptional operation control, operation control such as scaling out or scaling down of the servers included in the base station system 20 may be executed.

Moreover, for example, a part or all of the functions of FIG. 4 may be executed in the base station system 20.

The invention claimed is:

1. A control system, comprising:

at least one processor; and at least one memory device storing instructions which, when executed by the at least one processor, cause the at least one processor to perform operations comprising:

monitoring an operation state of a representative base station system of a plurality of base station systems included in a base station system group associated with an operation tendency of base station systems;

executing operation control in accordance with the operation state of the representative base station system, for at least one of the plurality of base station systems, which includes a base station system different from the representative base station system, and is included in the base station system group, wherein executing operation control comprises setting a central processing unit (CPU) frequency for the at least one of the plurality of base stations; and predicting, for each of the plurality of base station systems included in the base station system group, a traffic amount in an area covered by the each of the plurality of base station systems, wherein the executing comprises executing, when, for each of the plurality of base station systems included in the base station system group, normal operation control based on the traffic amount predicted for the each of the plurality of base station systems is being executed, exceptional operation control in accordance with the operation state of the representative base station system, for at least one of the plurality of base station systems, which includes a base station system different from the representative base station system, and is included in the base station system group, in response to a state in which a level of the operation state of the representative base station system exceeds a predetermined level.

2. The control system according to claim 1, wherein the executing comprises executing the operation control in response to a state in which a value indicating the operation state of the representative base station system satisfies a predetermined condition.

3. The control system according to claim 1, wherein the executing comprises executing the operation control in response to a state in which a level of the operation state of the representative base station system exceeds a predetermined level.

4. A control system, comprising:

at least one processor; and at least one memory device storing instructions which, when executed by the at least one processor, cause the at least one processor to perform operations comprising:

monitoring an operation state of a representative base station system of a plurality of base station systems included in a base station system group associated with an operation tendency of base station systems;

executing operation control in accordance with the operation state of the representative base station system, for at least one of the plurality of base station systems, which includes a base station system different from the representative base station system, and is included in the base station system group, wherein executing operation control comprises setting a central processing unit (CPU) frequency for the at least one of the plurality of base stations; and predicting, for each of the plurality of base station systems included in the base station system group, a traffic amount in an area covered by the each of the plurality of base station systems, wherein the executing comprises executing, when, for each of the plurality of base station systems included in the base station system group, normal operation control based on the traffic amount predicted for the each of the plurality of base station systems is being executed, exceptional operation control in accordance with the operation state of the representative base station system, for at least one of the plurality of base station systems, which includes a base station system different from the representative base station system, and is included in the base station system group, in response to a state in which a difference between an actual traffic amount of the representative base station system and the predicted traffic amount of the representative base station system satisfies a predetermined condition.

5. The control system according to claim 1, wherein the operations further comprise classifying a plurality of base station systems into a plurality of base station system groups each associated with an operation tendency of base station systems.

6. The control system according to claim 5, wherein the classifying comprises classifying the plurality of base station systems into the plurality of base station system groups based on a characteristic of areas covered by the base station systems.

7. The control system according to claim 5, wherein the classifying comprises classifying the plurality of base station systems into the plurality of base station system groups based on a tendency of a traffic transition or a transition of a number of accommodated persons in areas covered by the base station systems.

8. The control system according to claim 7, wherein the classifying comprises classifying the plurality of base station systems into the plurality of base station system groups based on a tendency of a traffic amount or a number of accommodated persons in each time period, each day of week, or each day-of-week period in the areas covered by the base station systems.

9. The control system according to claim 5, wherein the classifying comprises classifying the plurality of base station systems into the plurality of base station system groups based on a tendency of a traffic transition or a transition of a number of accommodated persons which is associated with a user attribute of users who perform communication in areas covered by the base station systems.

10. The control system according to claim 1, wherein the operations further comprise selecting the representative base station system from among the plurality of base station systems included in the base station system group.

11. The control system according to claim 1, the executing comprises executing power consumption control.

12. A control method, comprising:

monitoring an operation state of a representative base station system of a plurality of base station systems included in a base station system group associated with an operation tendency of base station systems;

executing operation control in accordance with the operation state of the representative base station system, for at least one of the plurality of base station systems, which includes a base station system different from the representative base station system, and is included in the base station system group, wherein executing operation control comprises setting a central processing unit (CPU) frequency for the at least one of the plurality of base stations; and predicting, for each of the plurality of base station systems included in the base station system group, a traffic amount in an area covered by the each of the plurality of base station systems, wherein the executing comprises executing, when, for each of the plurality of base station systems included in the base station system group, normal operation control based on the traffic amount predicted for the each of the plurality of base station systems is being executed, exceptional operation control in accordance with the operation state of the representative base station system, for at least one of the plurality of base station systems, which includes a base station system different from the representative base station system, and is included in the base station system group, in response to a state in which a level of the operation state of the representative base station system exceeds a predetermined level.

*     *     *     *     *